United States Patent
Anderson, Jr. et al.

(10) Patent No.: US 6,578,203 B1
(45) Date of Patent: Jun. 10, 2003

(54) AUDIO/VIDEO SIGNAL DISTRIBUTION SYSTEM FOR HEAD MOUNTED DISPLAYS

(76) Inventors: Tazwell L. Anderson, Jr., 3690 Northside Dr., Atlanta, GA (US) 30305; Mark A. Wood, 2839 Ponderosa Cir., Decatur, GA (US) 30033

( * ) Notice: Subject to any disclaimer, the term of this patent is extended or adjusted under 35 U.S.C. 154(b) by 0 days.

(21) Appl. No.: 09/322,411

(22) Filed: May 28, 1999

Related U.S. Application Data

(60) Provisional application No. 60/123,341, filed on Mar. 8, 1999.

(51) Int. Cl.[7] .................................................. H04N 7/16
(52) U.S. Cl. ............................ 725/141; 725/68; 725/74; 725/80; 348/143; 348/157; 455/351
(58) Field of Search ........................... 725/74, 75, 76, 725/77, 78, 80, 81, 82, 85, 63, 67, 68, 71, 18; 348/143, 584, 586–589, 825, 838, 157–8; 455/357

(56) References Cited

U.S. PATENT DOCUMENTS

| | | |
|---|---|---|
| 1,527,802 A | 2/1925 | Huggins |
| 1,648,832 A | 11/1927 | Urban |
| 2,603,724 A | 7/1952 | Kettler ........................ 179/182 |
| 2,856,469 A | 10/1958 | Morse ........................ 179/182 |
| 2,946,860 A | 7/1960 | Jansen et al. ................ 179/156 |
| 4,472,830 A | 9/1984 | Nagai ............................ 381/2 |
| 4,479,150 A | 10/1984 | Ilmer et al. .................. 358/310 |
| 4,486,897 A | 12/1984 | Nagai ............................ 381/2 |
| 4,504,861 A | 3/1985 | Dougherty .................. 358/143 |
| 4,572,323 A | 2/1986 | Randall ....................... 181/129 |
| 4,580,174 A | 4/1986 | Tokunaka ................... 358/328 |
| 4,605,950 A | 8/1986 | Goldberg et al. ............. 358/11 |
| 4,615,050 A | 10/1986 | Lonnstedt ...................... 2/209 |
| 4,620,068 A | 10/1986 | Wieder .................... 179/156 A |
| 4,727,585 A | 2/1988 | Flygstad ..................... 381/183 |
| 4,764,817 A | 8/1988 | Blazek et al. ................ 358/341 |
| 4,791,477 A | 12/1988 | Blazek et al. ................ 358/341 |
| 4,802,243 A | 2/1989 | Griffiths ............................ 2/6 |
| 4,809,079 A | 2/1989 | Blazek et al. ................ 358/335 |
| 4,830,138 A | 5/1989 | Palmaer et al. ............. 181/129 |
| 4,853,764 A * | 8/1989 | Sutter |
| 4,855,827 A | 8/1989 | Best ........................... 358/143 |
| 4,856,089 A | 8/1989 | Horton ........................ 455/351 |
| 4,856,118 A | 8/1989 | Sapiejewski ................... 2/209 |
| 4,864,425 A | 9/1989 | Blazek et al. ................ 358/335 |
| 4,866,515 A | 9/1989 | Tagawa et al. ................ 358/86 |
| 4,887,152 A | 12/1989 | Matsuzaki et al. ............ 358/86 |
| 4,944,361 A | 7/1990 | Lindgren et al. ........... 181/129 |
| 4,958,697 A | 9/1990 | Moody ....................... 181/129 |
| 4,965,825 A | 10/1990 | Harvey et al. ................. 380/9 |
| 4,982,278 A | 1/1991 | Dahl et al. .................... 358/88 |
| 4,983,967 A | 1/1991 | McKenzie .................. 341/110 |
| 5,018,599 A | 5/1991 | Dohi et al. .................. 181/129 |

(List continued on next page.)

FOREIGN PATENT DOCUMENTS

| | | | | |
|---|---|---|---|---|
| JP | 2001275101 A | * | 10/2001 | .......... H04N/7/173 |
| WO | WO 00/54554 | * | 9/2000 | ............. H04R/5/02 |

*Primary Examiner*—Andrew Faile
*Assistant Examiner*—Ngoc Vu
(74) *Attorney, Agent, or Firm*—Armstrong Teasdale LLP

(57) ABSTRACT

A video/audio system includes an interface device that receives a plurality of audio and video signals from a plurality of sources. The interface device combines these signals into various combinations and transmits the combinations to a receiver. The receiver is configured to interface one of the combinations of signals with a user. In this regard, the receiver allows the user to select one of the combinations, and in response, the receiver separates the video signal(s) of the selected combination from the audio signal(s) of the selected combination. Then, the receiver renders the video signal(s) via a display device and produces a sound defined by the audio signal(s) via a speaker. Accordingly, the user is able to control which set of audio and video signals are interfaced with the user.

12 Claims, 4 Drawing Sheets

U.S. PATENT DOCUMENTS

| | | | |
|---|---|---|---|
| 5,020,163 A | 6/1991 | Aileo et al. | 2/209 |
| 5,023,707 A | 6/1991 | Briggs | 358/343 |
| 5,023,955 A | 6/1991 | Murphy, II et al. | 2/209 |
| 5,046,192 A | 9/1991 | Ryder | 2/12 |
| 5,068,923 A | 12/1991 | Sjoqvist | 2/209 |
| 5,109,414 A | 4/1992 | Harvey et al. | 380/9 |
| 5,128,765 A | 7/1992 | Dingwall et al. | 358/182 |
| 5,138,440 A | 8/1992 | Radice | 358/13 |
| 5,138,722 A | 8/1992 | Urella et al. | 2/209 |
| 5,161,250 A * | 11/1992 | Ianna et al. | 455/66 |
| 5,173,721 A | 12/1992 | Green | 351/53 |
| 5,179,736 A | 1/1993 | Scanlon | 2/209 |
| 5,185,807 A | 2/1993 | Bergin et al. | 381/183 |
| 5,252,069 A | 10/1993 | Lamb et al. | 434/35 |
| 5,289,272 A | 2/1994 | Rabowsky et al. | 348/8 |
| 5,289,288 A | 2/1994 | Silverman et al. | 358/335 |
| 5,321,416 A | 6/1994 | Bassett et al. | 345/8 |
| 5,359,463 A | 10/1994 | Shirochi et al. | 360/19.1 |
| 5,414,544 A | 5/1995 | Aoyagi et al. | 359/53 |
| 5,420,381 A | 5/1995 | Gardner, Jr. et al. | 181/129 |
| 5,440,197 A | 8/1995 | Gleckman | 313/110 |
| 5,463,428 A | 10/1995 | Lipton et al. | 351/158 |
| 5,481,478 A | 1/1996 | Palmieri et al. | 364/514 R |
| 5,506,705 A | 4/1996 | Yamamoto et al. | 359/40 |
| 5,510,828 A * | 4/1996 | Lutterbach et al. | 348/13 |
| 5,513,384 A * | 4/1996 | Brennan | 455/180.1 |
| 5,585,858 A | 12/1996 | Harper et al. | 348/485 |
| 5,594,551 A | 1/1997 | Monta | 386/92 |
| 5,600,365 A | 2/1997 | Kondo et al. | 348/8 |
| 5,600,368 A * | 2/1997 | Matthews, III | 348/143 |
| 5,617,331 A | 4/1997 | Wakai et al. | 364/514 A |
| 5,631,693 A | 5/1997 | Wunderlich et al. | 348/7 |
| 5,642,221 A | 6/1997 | Fischer et al. | 359/477 |
| 5,666,151 A | 9/1997 | Kondo et al. | 348/8 |
| 5,668,339 A | 9/1997 | Shin | 84/634 |
| 5,671,320 A | 9/1997 | Cookson et al. | 386/97 |
| 5,682,172 A | 10/1997 | Travers et al. | 345/8 |
| 5,696,521 A | 12/1997 | RIbinson et al. | 345/8 |
| 5,712,950 A | 1/1998 | Cookson et al. | 386/97 |
| 5,719,588 A | 2/1998 | Johnson | 345/8 |
| 5,729,471 A | 3/1998 | Jain et al. | 364/514 |
| 5,742,521 A | 4/1998 | Ellenby et al. | 364/550 |
| 5,754,254 A | 5/1998 | Kobayashi et al. | 348/578 |
| 5,760,819 A | 6/1998 | Sklar et al. | 348/8 |
| 5,767,820 A | 6/1998 | Bassett et al. | 345/8 |
| 5,809,574 A | 9/1998 | Falco et al. | 2/209 |
| 5,812,224 A | 9/1998 | Maeda et al. | 349/13 |
| 5,815,126 A | 9/1998 | Fan et al. | 345/8 |
| 5,835,609 A | 11/1998 | LeGette et al. | 381/187 |
| 5,844,656 A | 12/1998 | Ronzani et al. | 351/158 |
| 5,867,223 A | 2/1999 | Schindler et al. | 348/552 |
| 5,880,773 A | 3/1999 | Suzuki | 348/115 |
| 5,887,286 A | 3/1999 | Waldron | 2/209 |
| 5,894,320 A | 4/1999 | Vancelette | 348/7 |
| 5,900,849 A | 5/1999 | Gallery | 345/8 |
| 5,903,395 A | 5/1999 | Rallison et al. | 359/630 |
| 6,100,925 A * | 8/2000 | Rosser et al. | |

* cited by examiner

AUDIO/VIDEO SIGNAL DISTRIBUTION SYSTEM FOR HEAD MOUNTED DISPLAYS

CROSS REFERENCE TO RELATED APPLICATION

This document claims priority to and the benefit of the filing date of copending provisional application entitled "Audio/Video Signal Distribution System for Head Mounted Displays," assigned serial No. 60/123,341, and filed Mar. 8, 1999, which is hereby incorporated by reference.

BACKGROUND OF THE INVENTION

1. Field of the Invention

The present invention generally relates to video and audio signal processing techniques and, in particular, to a system and method for receiving video and audio signals from a plurality of sources and for providing a user with multiple combinations of these signals to select from.

2. Related Art

Audio and video signals are generated from a plurality of sources during many events. For example, at an auto race, television crews usually position cameras at various locations within view of a race track. These cameras generate video signals defining views of the race track from various perspectives. In addition, microphones positioned at various locations generate audio signals defining different sounds at the auto race. For example, microphones may be located close to the race track to receive sounds produced by the vehicles participating in the race, and microphones may be located close to television commentators to receive the comments of the commentators as they observe and comment on the race.

One of the video signals and one or more of the audio signals are usually selected and combined together at a television station to form a combined video/audio signal. This signal is then modulated and transmitted so that users having a television can receive the combined signal via the television. The television demodulates the combined signal and displays an image defined by the video signal on a display screen and reproduces the sounds defined by the audio signals via speakers. Therefore, the sights and sounds of the race can be viewed and heard via the television.

In addition, one or more of the audio signals, such as audio signals defining the comments of radio commentators, are usually selected and modulated at a radio station to form a radio signal. This radio signal is then transmitted as a wireless signal so that users having radios can receive the signal via a radio. The radio demodulates the signal and reproduces the sounds defined by the radio signal via speakers.

However, users viewing and/or hearing the sights and sounds of the race via televisions and/or radios are not usually given the opportunity to select which video and/or audio signals are modulated and transmitted to the television and/or radio. Therefore, the user is only able to receive the signals modulated and transmitted to the television and/or radio, even though the user may prefer to receive the other audio and/or video signals that are generated at the auto race.

Spectators who actually attend the auto race are usually given more options to view and/or hear the sights and/or sounds of the race from different perspectives. In this regard, a plurality of monitors are usually located at a particular location in the stadium. As used herein, "stadium" shall be defined to mean any non-movable structure having a large number (i.e., thousands) of seats, wherein an event occurs at (i.e., within a close proximity) of the seats such that spectators sitting in the seats can view the event. An "event" is any occurrence viewed by a spectator.

Each monitor within the stadium receives one of the aforementioned video signals and displays an image defined by the received video signal. Therefore, a spectator can view the monitor displaying the image that has a perspective desirable to the spectator. However, the monitor having the desired perspective is often not located in a convenient location for the spectator. In this regard, the spectator usually must leave his seat (or other location) in the stadium and go to a location where the spectator, along with other spectators, can view the monitor displaying the desired perspective.

Thus a heretofore unaddressed need exists in the industry for providing a system and method that enables a spectator to conveniently view an event from different perspectives.

SUMMARY OF THE INVENTION

The present invention overcomes the inadequacies and deficiencies of the prior art as discussed hereinbefore. Generally, the present invention provides a video/audio system and method for receiving video and audio signals from a plurality of sources and for providing a user with multiple combinations of these signals to select from.

The present invention includes an interface device that receives a plurality of audio and video signals from a plurality of sources. The interface device combines these signals into various combinations and transmits the combinations to a receiver. The receiver is configured to interface one of the combinations of signals with a user. In this regard, the receiver allows the user to select one of the combinations, and in response, the receiver separates the video signal(s) of the selected combination from the audio signal(s) of the selected combination. Then, the receiver renders the video signal(s) via a display device and produces a sound defined by the audio signal(s) via a speaker. Accordingly, the user is able to control which set of audio and video signals are interfaced with the user.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The preferred embodiment of the present invention will be described hereafter in the context of auto racing applications. However, the scope of the present invention should not be so limited, and it should be apparent to one skilled in the art that the principles of the present invention may be employed in the context of other applications, particularly in the context of other sporting events (e.g., football games, basketball, games, baseball games, hockey matches, etc.).

Figure 1:
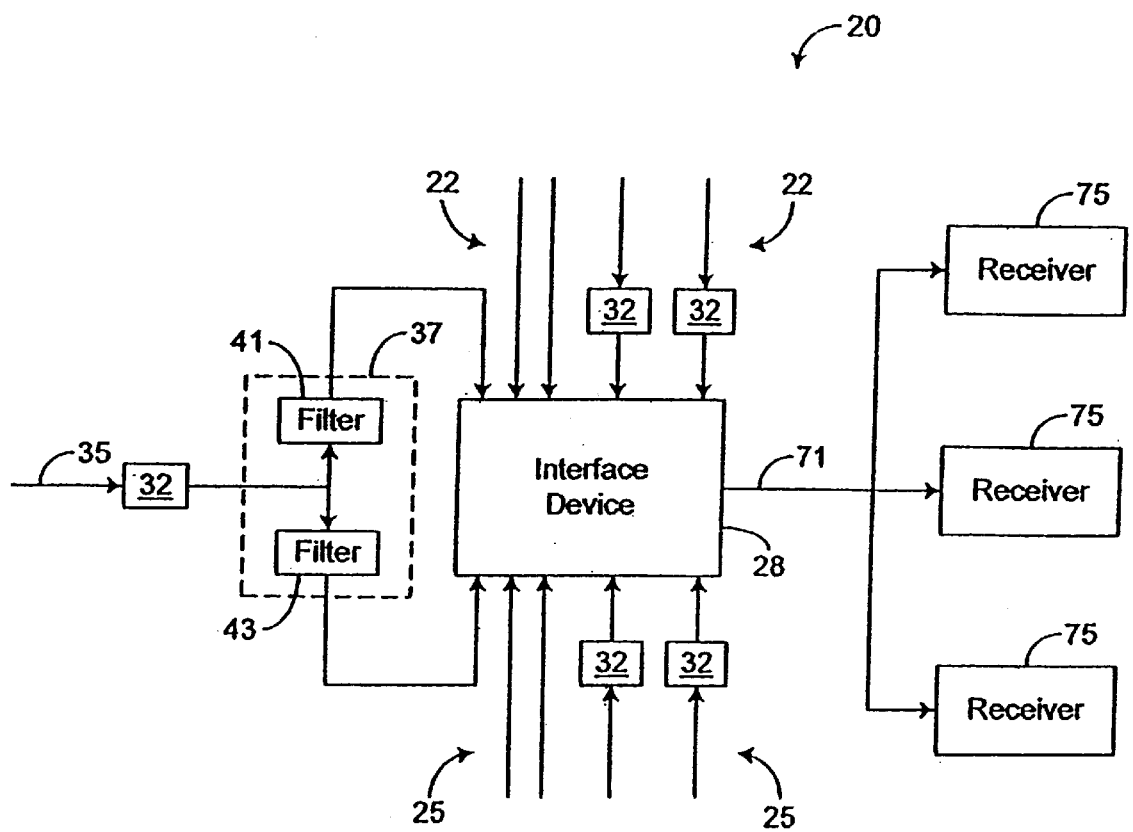
FIG. 1 is a block diagram illustrating a video/audio system in accordance with the present invention.

FIG. 1 depicts a video/audio system 20 implementing the principles of the present invention. At least one video signal 22 and at least one audio signal 25 are received by an interface device 28. Each of the received video signals 22 defines a view of the race from a different perspective. For example, the video signals 22 may be generated by different video cameras located at different locations around the stadium, including inside at least some of the vehicles participating in the race.

Furthermore, each of the audio signals 25 defines different sounds associated with the race. For example, at least one of the audio signals 25 may be generated from a microphone located close to the track or in one of the vehicles such that the audio signal 25 defines noise from the vehicles participating in the race. Alternatively, at least one of the audio signals 25 may define the comments of television commentators, and at least one of the audio signals 25 may define the comments of radio commentators. Furthermore, at least one of the audio signals 25 may define the comments between one of the drivers participating in the race and the driver's pit crew.

Some of the video and audio signals 22 and 25 can be unmodulated when transmitted to the interface device 28 and, therefore, do not need to be demodulated by the system 20. However, some of the video and audio signals 22 and 25 may need to be demodulated by the system 20. For example, at least one of the audio signals 25 defining the comments of the radio commentators may be modulated as a radio signal for transmission to radios located at or away from the stadium, and at least one of the video signals 25 may be modulated as a television signal for transmission to televisions located at or away from the stadium. In addition, the comments between a driver and the driver's pit crew are usually transmitted via ultra high frequency (UHF) radio waves, which are known to be modulated signals. Therefore, as shown by FIG. 1, the system 20 preferably includes demodulators 32 configured to receive and demodulate the video and/or audio signals 22 and 25.

It is possible for some of the video and audio signals 22 and 25 to be received from a combined signal 35, which is comprised of at least one video signal 22 combined with at least one audio signal 25. For example, the combined signal 35 may be a television signal modulated for transmission to televisions located at or away from the track stadium. To facilitate the combination of different audio signals 25 with the video signal(s) 22 defined by the combined signal 35, a separator 37 preferably separates the combined signal 35 into its respective video signal 22 and audio signal 25, as shown by FIG. 1.

Various configurations of the separator 37 may exist without departing from the principles of the present invention. FIG. 1 depicts a possible implementation of the separator 37. In this regard, the separator 37 includes an audio signal filter 41 designed to filter out any audio signals 25 from the combined signal 35 and to transmit the resulting video signal(s) 22 to interface device 28. Furthermore, the separator 37 also includes a video signal filter 43 designed to filter out any video signals 22 from the combined signal 35 and to transmit the resulting audio signal(s) 25 to interface device 28. If more than one video signal 22 or more than one audio signal 25 is included in the combined signal 35, then the separator 37 may include additional filters (not shown) to separate the multiple video and/or audio signals 22 and 25 into individual signals before transmitting the signals 22 and 25 to the interface device 28.

Figure 2:
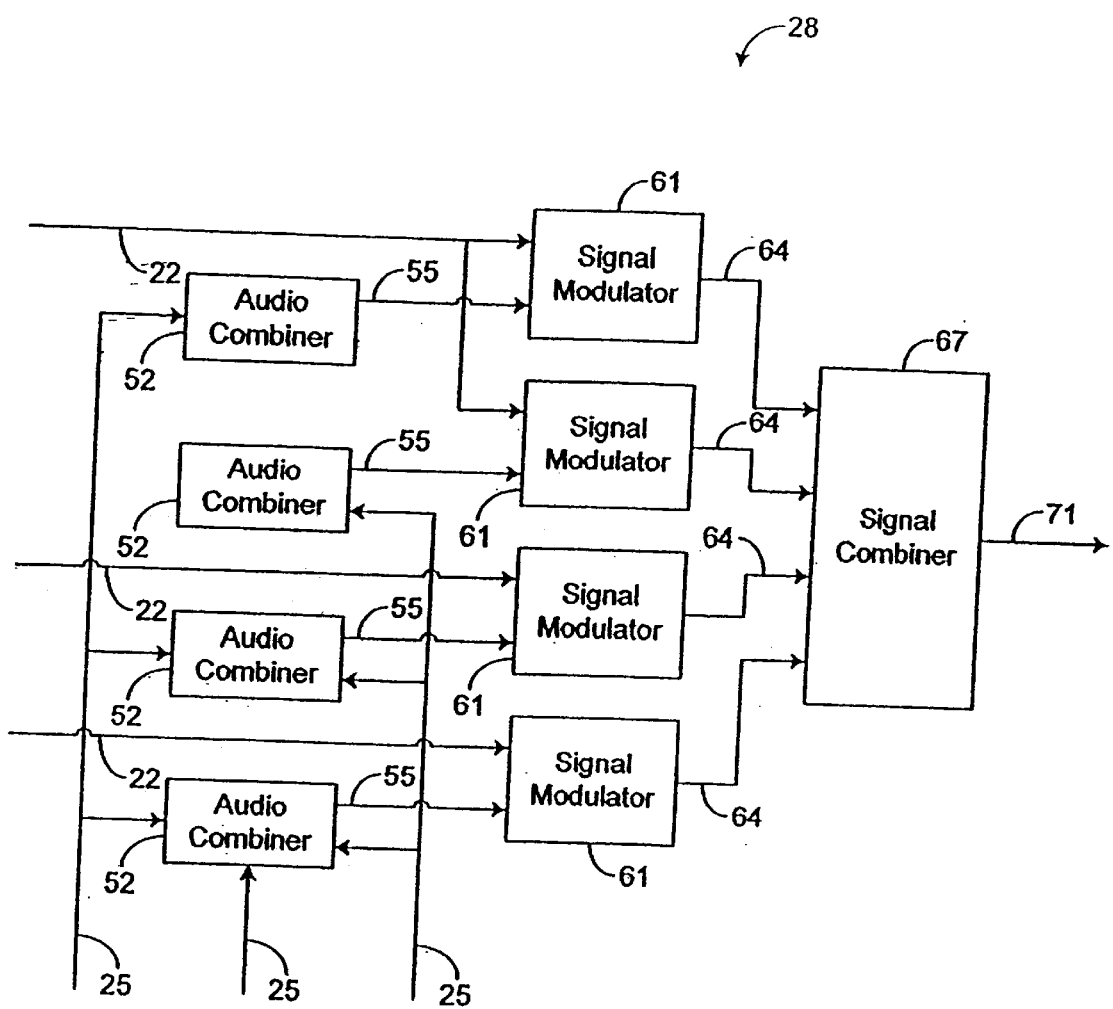
FIG. 2 is a block diagram illustrating a detailed view of an interface device depicted in FIG. 1.

FIG. 2 depicts a more detailed view of the interface device 28. The interface device 28 includes audio combiners 52 configured to receive audio signals 25 and to combine the received audio signals 25 into a single combined audio signal 55. As shown by FIG. 2, each audio combiner 52 preferably receives a different combination of audio signals 25, although it is possible for any one of the combined signals 55 to include the same combination of audio signals 25 as any other combined signal 55. Note that when an audio combiner 52 receives only one audio signal 25, the combined signal 55 output by the combiner 52 matches the one signal 25 received by the combiner 52.

As an example, one of the combined signals 55 may include an audio signal 25 defining comments between a driver and the driver's pit crew and also an audio signal 25 defining sounds (ie., vehicular noises) received by a microphone located in the driver's vehicle. Another of the combined signals 55 may include the aforementioned audio signals 25 as well as an audio signal 25 defining a radio commentator's comments. Another combined signal 55 may only include an audio signal 25 defining a television commentator's comments. Accordingly, the combined signals 55 preferably define different combinations of sounds. It should be noted that combinations of audio signals 25 other than those described hereinabove are possible.

As shown by FIG. 2, each combined signal 55 is transmitted to a respective signal modulator 61. Each signal modulator 61 is also configured to receive a respective one of the video signals 25 received by the interface device 28. Each signal modulator 61 is configured to combine the received combined signal 55 and video signal 25 and to modulate the received signals 55 and 25 on a unique frequency range. The signal modulator 61 is then designed to transmit the modulated signal 64, which comprises the combined signal 55 and the video signal 25 received by the signal modulator 61, to a combiner 67. The combiner 67 is configured to combine each of the modulated signals 64 transmitted from each of the signal modulators 61 into a single combined (i.e., multiplexed) signal 71. This combined signal 71 is then transmitted to a plurality of receivers 75.

Various techniques exist for transmitting combined signal 71 to receivers 75. For example, a coaxial cable may be used to transmit the combined signal 71 to each of the receivers 75. In another example, the system 20 may include a wireless transmitter (not shown) that transmits the combined signal 71 to the receivers 75. Any technique for transmitting the combined signal 71 to the receivers 75 should be suitable for implementing the present invention.

Figure 3:
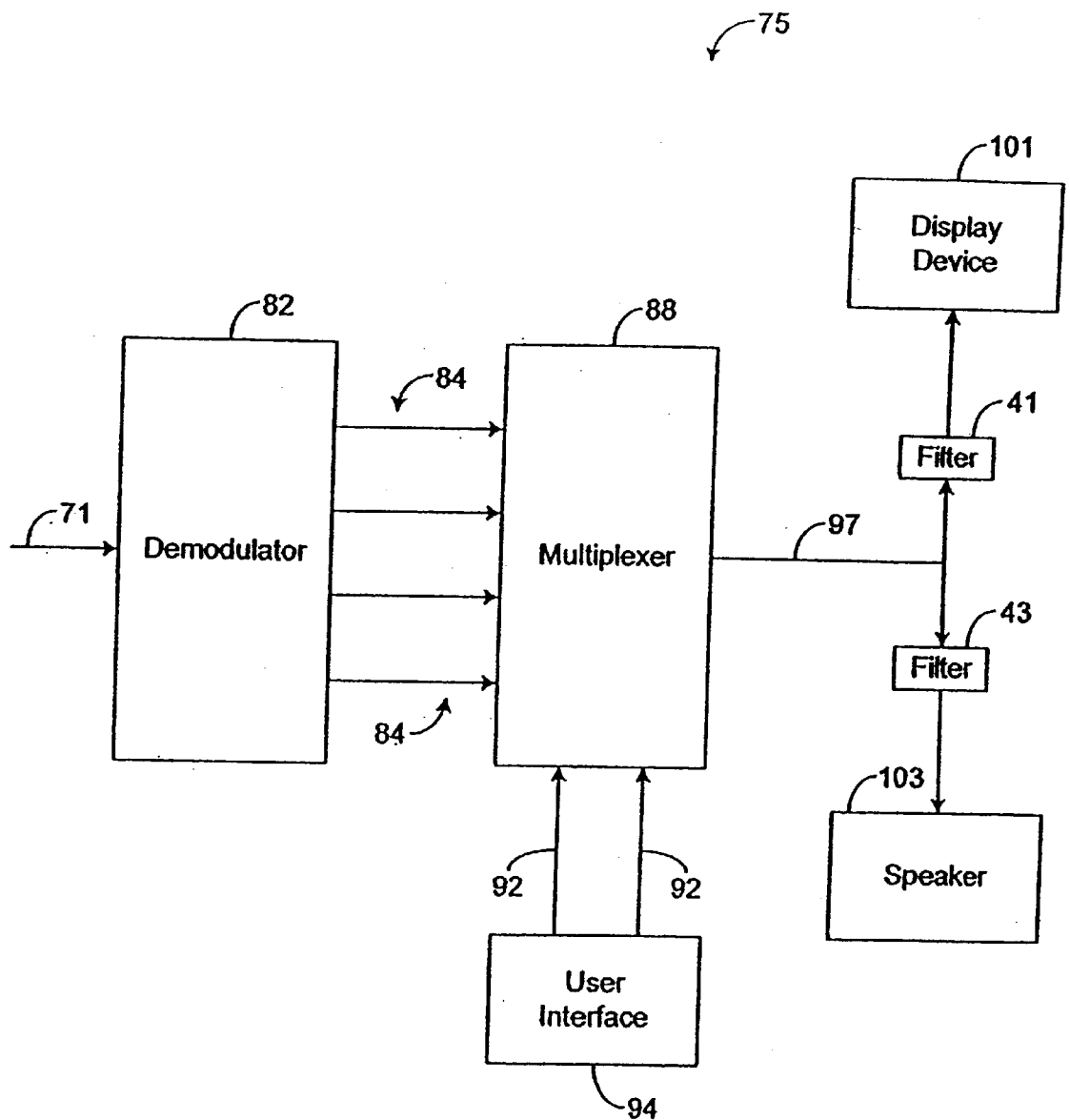
FIG. 3 is a block diagram illustrating a detailed view of a receiver depicted in FIG.

A more detailed view of receiver 75 is shown by FIG. 3. Receiver 75 preferably includes a demodulator 82. The demodulator 82 is configured to demodulate the combined signal 71 and to separate (i.e., demultiplex) the combined signal 71 into signals 84 based on frequency, such that each signal 84 respectively corresponds with one of the modulated signals 64. In this regard, the demodulator 82 recovers the individual signals 64 as signals 84, and each signal 84 is, therefore, defined by the same video and audio signals 22 and 25 that define its corresponding modulated signal 64. Therefore, like modulated signals 64, each signal 84 is preferably comprised of a unique combination of video and audio signals 22 and 25.

Signals 84 are transmitted from demodulator 82 to a multiplexer 88, which also receives control signals 92 from a user interface 94. The user interface 94 preferably includes buttons or other types of switches that enable a spectator to select one of the signals 84 via control signals 92. In this regard, the multiplexer 88, through techniques well known in the art, selects one of the signals 84 based on control signals 92 and outputs the selected signal 84 as output signal 97, as shown by FIG. 3.

The receiver 75 includes an audio signal filter 41 configured to filter the audio signal(s) 25 out of signal 97. Therefore, only the video signal(s) 22 within signal 97 are transmitted to a display screen 101, which is configured to render the received video signal(s) 22 (i.e., display an image defined by the received video signal(s) 22) to the spectator.

The receiver 75 also includes a video signal filter 43 configured to filter the video signal(s) 22 out of signal 97. Therefore, only the audio signal(s) 25 within signal 97 are transmitted to a speaker 103, which is configured to produce sounds defined by the received audio signal(s) 25, through techniques well known in the art.

Figure 4:
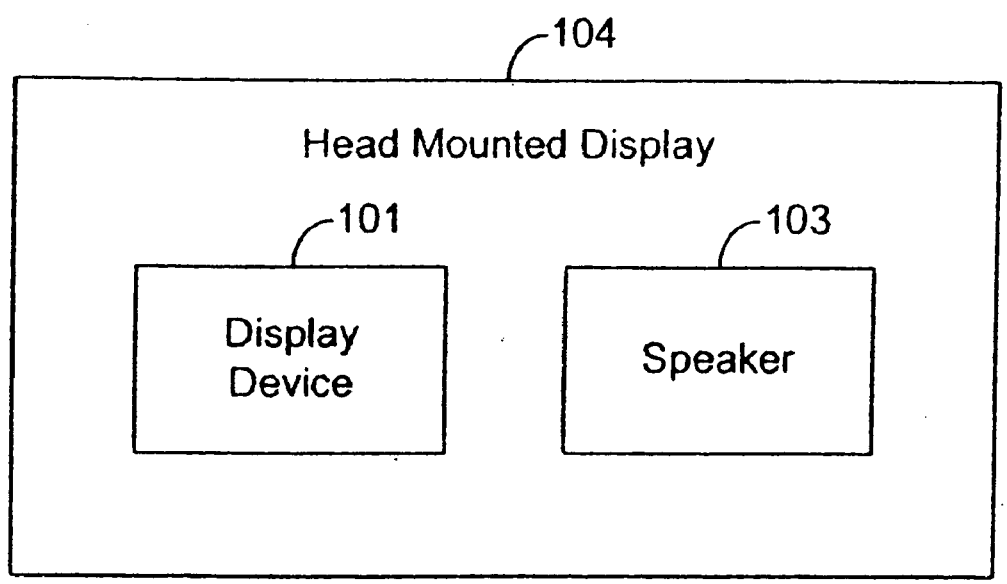
FIG. 4 is a block diagram illustrating a head mounted display of the receiver depicted in FIG. 3.

In the preferred embodiment, as shown by FIG. 4, the display screen 101 and speaker 103 are included within a head mounted display (HMD) 104, which is a well known device of the prior art. An example of a head mounted display suitable for implementing the present invention is fully described in U.S. Pat. No. 5,844,656, entitled "Head Mounted Display with Adjustment Components" and filed on Nov. 7, 1996, by Ronzani et al., which is incorporated herein by reference. Furthermore, when the combined signal 71 is transmitted via a coaxial cable, the receiver 75 may be located at a spectator's stadium seat or other convenient location. When the combined signal 71 is transmitted via a wireless transmitter, the receiver 75 is portable, and a spectator may carry the receiver 75 with him and choose where he would like to view the images and hear the sounds produced by the receiver 75.

Accordingly, the spectator may remain in his seat (or other convenient location) and control, by manipulating buttons or other types of switches in the user interface 94, which combination of video and audio signals 22 and 25 are respectively transmitted to display screen 101 and speaker 103. Therefore, the system 20 gives the spectator more flexibility in how the spectator views the race and, as a result, makes the race a more enjoyable experience.

OPERATION

The preferred use and operation of the video/audio system 20 and associated methodology are described hereafter.

Assume for illustrative purposes only that a spectator would like to attend an auto race and would like to have access to an in-car view from a camera within his favorite driver's car. In addition, the spectator would also like to continuously hear the dialogue between the aforementioned driver and the driver's pit crew, as well as the comments provided by his favorite radio commentator. It should be apparent that other views and/or sounds may be desirable in other examples.

In the past, the spectator would have to attend the race and acquire (as well as tune) a radio to receive the commentator's comments and a radio to receive the radio signals transmitted between the driver and the driver's pit crew. Then, the spectator would have to locate a monitor at the stadium displaying the in-car view that he desires to see. The spectator would then remain within sight of the monitor and listen to the two radios. If the monitor is not located in a desirable location for viewing the race, the spectator would have to choose between viewing the monitor and viewing the race at a desirable location. Furthermore, the handling of multiple radios is generally cumbersome and distracting.

However, in accordance with the present invention, the user attends the race and is provided a receiver 75 for his individual use. In the preferred embodiment, the receiver 75 is located at the spectator's seat within the stadium. However, the receiver 75 may be located at other convenient locations, and when the combined signal 71 is transmitted via a wireless transmitter, the spectator may carry the receiver 75 around with him to any desirable location in or around the stadium.

The spectator then manipulates buttons or other types of switches at user interface 94 to control which signal 84 is output by multiplexer 88 and, therefore, which signals 22 and 25 are respectively received by display 101 and speaker 103. Accordingly, the spectator may use the receiver 75 to see the desired view of the race (i.e., the in-car view) and to hear the desired sounds of the race (i.e., the sounds received by the microphone in his favorite driver's car, the dialogue between the driver and the driver's pit crew, and the comments from the radio commentator).

In this regard, the interface device 28 preferably receives at least a video signal 22 defining the in-car view of his favorite driver and a plurality of audio signals 25 defining the sounds received by the microphone in his favorite driver's car, the dialogue between the driver and the driver's pit crew, and the comments from the radio commentator. At least one of the audio combiners 52 combines these audio signals 25 into a combined signal 55. One of the signal modulators 61 receives this combined signal 55 and the video signal 22 defining the desired in-car view. This video signal 22 is modulated and combined with the foregoing combined signal 55 by one of the signal modulators 61 to create a modulated signal 64. This modulated signal 64 is combined with other modulated signals 64 and transmitted to the spectator's receiver 75 via combiner 67.

The demodulator 82 in the spectator's receiver 75 demodulates and separates the received signal 71 into separate signals 84. Based on the control signals 92 received from user interface 94, the multiplexer 88 allows only the signal 84 defined by the aforementioned video and audio signals 22 and 25 to pass. Therefore, these video and audio signals 22 and 25 are respectively transmitted to the display 101 and speaker 103 and the spectator may enjoy the view and sounds that he selected.

It should be noted that it is not necessary for the spectator to keep the receiver 75 within the stadium. In this regard, the signal 71 may be transmitted via satellites and/or communication networks to various locations around the world, and the spectator may select the view and sounds he prefers the most from just about any location capable of receiving signal 71.

It should also be noted that the receiver 75 may be retrieved from the spectator after the spectator is finished viewing the event so that the receiver can be provided to another spectator for another event at the stadium. Each spectator is preferably charged a usage fee for spectator's use of the receiver 75.

Furthermore, the present invention has been described herein in the context of auto racing. However, the system 20 may be useful in other applications as well. The system 20 would be useful in any application where it is desirable for the user to control the types of views and sounds of an event that are presented to the user. For example, the present invention could be particularly useful in any type of sporting event or other type of event attended by a large number of people.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A method of implementing an audio/video system at a stadium during an event, the method comprising:
    using a portable receiver and portable display at a stadium during an event;
    combining, at an audio/video interface located at the stadium, a plurality of audio signals and a plurality of video signals associated with the event to form a combined audio/video signal;
    transmitting, via a wireless RF transmission, said combined audio/video signal from said audio/video interface directly to said portable receiver at the stadium;
    selecting, at said portable receiver, one of said video signals; and
    displaying, via said portable display, an image defined by said video signal selected in said selecting step.

2. The method of claim 1, wherein said combining step includes modulating each of said video signals in a unique frequency range in said combined audio/video signal.

3. The method of claim 2, further comprising separating said combined audio/video signal, at said receiver, into individual audio and video signals based on frequencies at which said audio and video signals are transmitted in said combined audio/video signal.

4. A method for viewing an event at a stadium, the method comprising:
    using a portable receiver and portable display at a stadium during an event;
    combining a plurality of video signals to form a combined signal, at least two of said video signals defining different views of the event, said video signals being maintained within said combined signal in unique frequency ranges;
    transmitting said combined signal from a transmitter located at the stadium directly to said portable receiver at the stadium;
    selecting, at said portable receiver, one of said video signals; and
    displaying, via said portable display, an image defined by said video signal selected in said selecting step.

5. The method of claim 4, further comprising:
    separating said combined signal, at said portable receiver, into individual video signals based on said unique frequency ranges.

6. The method of claim 4, wherein a spectator carries said portable receiver and portable display and chooses where the spectator would like to view said image at the stadium.

7. A method, comprising:
    providing a portable receiver to a spectator for use at a stadium during an event, the portable receiver including a display and a speaker;
    combining, at an interface device, a first combination of audio signals associated with the event to form a first audio signal combination;
    combining, at the interface device, a second combination of audio signals associated with the event to form a second audio signal combination, said first and second audio signal combinations containing different combinations of audio signals;
    combining, at the interface device, said first and second audio signal combinations and a plurality of video signals associated with the event to form a combined audio/video signal;
    transmitting said combined audio/video signal to the portable receiver;
    displaying on the display a video signal selected by the spectator from said plurality of video signals; and
    playing over the speaker a selected one of said first and second audio signal combinations selected by the spectator.

8. The method of claim 7, wherein said first audio signal combination includes first and second audio signals associated with the event and said second audio signal combination includes only a single audio signal associated with the event.

9. The method of claim 7, wherein the event is a car race and said first audio signal combination includes both dialogue between a driver and the driver's pit crew and comments from a radio commentator, said playing step continuously playing both said dialogue and said comments.

10. The method of claim 7, wherein the event is a car race and the video signal selected by the spectator is a desired in-car view.

11. A method for viewing an event at a stadium, comprising:
    providing a portable receiver to a spectator for use at the stadium during the event, the portable receiver including a display and a speaker;
    receiving, at the receiver, a combined audio/video signal containing a plurality of video signals associated with the event and containing at least first and second audio signal combinations, each of said first and second audio signal combinations including corresponding different first and second combinations of audio signals associated with the event;
    selecting, from said combined audio/video signal, one of said video signals and one of said first and second audio signal combinations based on a selection by the spectator; and
    displaying on the display a video signal selected by the spectator from said plurality of video signals; and
    playing over the speaker a selected one of said first and second audio signal combinations.

12. The method of claim 11, further comprising separating said combined audio/video signal into individual video signals and separating said first and second audio signal combinations based on frequencies, in said combined audio/video signal, of said video signals and said first and second audio signal combinations.

\* \* \* \* \*